United States Patent
Dai et al.

(10) Patent No.: US 12,132,544 B2
(45) Date of Patent: Oct. 29, 2024

(54) DOWNLINK SIGNAL PROCESSING METHOD AND APPARATUS, AND BASE STATION

(71) Applicant: XI'AN ZHONGXING NEW SOFTWARE CO., LTD., Xi'an (CN)

(72) Inventors: Shuzhou Dai, Shenzhen (CN); Chao Du, Shenzhen (CN); Yangfeng Wang, Shenzhen (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 0 days.

(21) Appl. No.: 17/788,929

(22) PCT Filed: Nov. 20, 2020

(86) PCT No.: PCT/CN2020/130432
§ 371 (c)(1),
(2) Date: Jun. 24, 2022

(87) PCT Pub. No.: WO2021/129265
PCT Pub. Date: Jul. 1, 2021

(65) Prior Publication Data
US 2023/0051882 A1 Feb. 16, 2023

(30) Foreign Application Priority Data

Dec. 27, 2019 (CN) .......................... 201911377265.2

(51) Int. Cl.
*H04B 7/06* (2006.01)
*H04L 5/00* (2006.01)
*H04L 27/36* (2006.01)

(52) U.S. Cl.
CPC ......... *H04B 7/0617* (2013.01); *H04L 5/0053* (2013.01); *H04L 27/36* (2013.01)

(58) Field of Classification Search
CPC .......... H04B 7/0617; H04B 7/04; H04B 7/06; H04B 7/0613; H04B 7/0615;
(Continued)

(56) References Cited

U.S. PATENT DOCUMENTS 6,005,894 A * 12/1999 Kumar ................... H04H 20/36
375/321
6,661,856 B1 * 12/2003 Calderbank ........... H04L 1/0618
375/267
(Continued)

FOREIGN PATENT DOCUMENTS

| CN | 102299735 A | 12/2011 |
|---|---|---|
| CN | 102984107 A | 3/2013 |

(Continued)

OTHER PUBLICATIONS

International Searching Authority. International Search Report and Written Opinion for PCT Application No. PCT/CN2020/130432 and English translation, mailed Feb. 7, 2021, pp. 1-11.

(Continued)

*Primary Examiner* — James M Perez
(74) *Attorney, Agent, or Firm* — Vivacqua Crane, PLLC

(57) ABSTRACT

Disclosed are a downlink signal processing method and apparatus, a base station, and a non-transitory computer-readable medium. The downlink signal processing method may includes performing resource element mapping on an unmodulated downlink signal, and performing modulation on the downlink signal that has been subjected to the resource element mapping to obtain modulated data.

9 Claims, 3 Drawing Sheets

(58) Field of Classification Search
CPC ......... H04L 5/0053; H04L 27/36; H04L 5/00; H04L 5/003; H04L 27/00; H04L 27/32; H04L 27/34; H04L 27/356
See application file for complete search history.

(56) References Cited

U.S. PATENT DOCUMENTS

| | | | | |
|---|---|---|---|---|
| 7,499,496 | B2* | 3/2009 | Fujii | H04L 27/2621 375/267 |
| 7,515,655 | B2* | 4/2009 | Uchida | H04B 7/0865 375/267 |
| 7,620,111 | B2* | 11/2009 | Palin | H04L 1/0032 375/260 |
| 7,724,835 | B2* | 5/2010 | Naguib | H04L 1/0618 375/267 |
| 7,729,438 | B2* | 6/2010 | Ouyang | H04L 1/0041 375/267 |
| 7,924,943 | B2* | 4/2011 | Kim | H04L 1/0026 455/25 |
| 8,050,356 | B2* | 11/2011 | Nam | H04L 1/0071 375/267 |
| 8,135,082 | B2* | 3/2012 | Choi | H04L 1/0041 375/264 |
| 8,238,488 | B1* | 8/2012 | Lee | H04L 25/03331 375/262 |
| 8,325,844 | B2* | 12/2012 | Walton | H04L 5/0023 375/267 |
| 8,374,258 | B2* | 2/2013 | Yamasuge | H04L 5/0064 375/132 |
| 8,406,323 | B2* | 3/2013 | Huang | H04L 27/26522 375/299 |
| 8,442,139 | B2* | 5/2013 | Lee | H04B 7/0639 375/267 |
| 8,559,552 | B2* | 10/2013 | Wang | H04L 27/28 375/264 |
| 8,731,080 | B1* | 5/2014 | Azenkot | H04L 43/0888 375/260 |
| 8,774,310 | B2* | 7/2014 | Khan | H04L 25/03343 375/296 |
| 8,917,796 | B1* | 12/2014 | Mayrench | H04B 7/0697 375/267 |
| 9,001,918 | B2* | 4/2015 | Taori | H04L 27/2646 375/284 |
| 9,191,080 | B2* | 11/2015 | Yokomakura | H04B 7/0413 |
| 9,300,510 | B2* | 3/2016 | You | H04L 1/0071 |
| 9,491,026 | B2* | 11/2016 | Murakami | H04L 27/0008 |
| 9,680,614 | B2* | 6/2017 | Gazit | H04L 5/0007 |
| 9,729,375 | B2* | 8/2017 | Choi | H04H 20/33 |
| 9,942,011 | B2* | 4/2018 | Tang | H04L 25/03834 |
| 10,009,078 | B2* | 6/2018 | Asakura | H04L 5/023 |
| 10,135,582 | B1* | 11/2018 | Sun | H04L 1/0071 |
| 10,348,386 | B1* | 7/2019 | Nammi | H04B 7/0658 |
| 10,491,443 | B1* | 11/2019 | Khan | H04B 1/04 |
| 10,536,196 | B2* | 1/2020 | Geng | H04B 7/0413 |
| 10,736,124 | B2* | 8/2020 | Zhang | H04B 7/0617 |
| 10,951,359 | B2* | 3/2021 | Huang | H04L 5/0094 |
| 11,013,041 | B2* | 5/2021 | Stauffer | H04L 5/0007 |
| 11,071,139 | B2* | 7/2021 | Talarico | H04L 1/1819 |
| 11,206,638 | B2* | 12/2021 | Wu | H04W 72/02 |
| 11,375,495 | B2* | 6/2022 | Wu | H04L 5/0053 |
| 11,419,108 | B2* | 8/2022 | Wu | H04W 72/044 |
| 11,438,125 | B2* | 9/2022 | Zhang | H04L 1/1812 |
| 11,502,805 | B2* | 11/2022 | Davydov | H04L 5/0007 |
| 11,528,683 | B2* | 12/2022 | Rhim | H04W 72/20 |
| 11,743,013 | B2* | 8/2023 | Zhang | H04L 5/0053 370/329 |
| 11,825,488 | B2* | 11/2023 | Talarico | H04L 5/0055 |
| 11,871,385 | B2* | 1/2024 | Wu | H04B 7/0617 |
| 2003/0003863 | A1* | 1/2003 | Thielecke | H04L 25/0248 455/39 |
| 2003/0031233 | A1* | 2/2003 | Kim | H04L 1/0068 375/298 |
| 2003/0081690 | A1* | 5/2003 | Kim | H04L 27/34 375/264 |
| 2003/0123383 | A1* | 7/2003 | Korobkov | H04L 5/0037 370/208 |
| 2004/0120274 | A1* | 6/2004 | Petre | H04L 1/0675 370/320 |
| 2004/0192218 | A1* | 9/2004 | Oprea | H04L 25/03343 455/73 |
| 2004/0196919 | A1* | 10/2004 | Mehta | H04L 1/0009 375/267 |
| 2005/0152473 | A1* | 7/2005 | Maltsev | H04L 12/56 375/267 |
| 2005/0185575 | A1* | 8/2005 | Hansen | H04B 7/0613 370/208 |
| 2006/0262714 | A1* | 11/2006 | Tarokh | H04L 27/2615 370/480 |
| 2009/0279620 | A1* | 11/2009 | Schenk | H04L 27/183 375/295 |
| 2009/0285325 | A1* | 11/2009 | Zhou | H04L 25/03343 375/267 |
| 2010/0014604 | A1* | 1/2010 | Motoyoshi | H04L 1/1887 375/260 |
| 2010/0091905 | A1* | 4/2010 | Khan | H04L 5/006 375/296 |
| 2010/0157786 | A1* | 6/2010 | Akita | H04L 5/023 370/210 |
| 2013/0195213 | A1* | 8/2013 | Fazlollahi | H04L 27/2614 375/267 |
| 2013/0216001 | A1* | 8/2013 | Petrov | H03M 13/036 375/299 |
| 2013/0290816 | A1* | 10/2013 | Shinohara | H03M 13/2906 714/776 |
| 2014/0119474 | A1* | 5/2014 | Petrov | H04L 1/0643 375/295 |
| 2015/0103944 | A1* | 4/2015 | Shitomi | H04L 27/2613 375/295 |
| 2016/0080961 | A1* | 3/2016 | Kim | H04L 27/2654 370/252 |
| 2016/0099789 | A1* | 4/2016 | Zhang | H04J 11/003 370/329 |
| 2016/0119071 | A1* | 4/2016 | Sagong | H04J 11/005 455/561 |
| 2016/0192297 | A1* | 6/2016 | Kim | H04W 52/42 455/522 |
| 2016/0345330 | A1* | 11/2016 | Mouhouche | H04L 1/0045 |
| 2017/0257774 | A1* | 9/2017 | Ghosh | H04W 16/14 |
| 2018/0109410 | A1* | 4/2018 | Kim | H04L 27/2613 |
| 2018/0183509 | A1* | 6/2018 | Luo | H04B 7/01 |
| 2019/0115996 | A1* | 4/2019 | Wu | H04L 1/0003 |
| 2019/0173730 | A1* | 6/2019 | Nakayama | H04L 27/38 |
| 2019/0222279 | A1* | 7/2019 | Xi | H04B 7/0617 |
| 2019/0268917 | A1* | 8/2019 | Zhang | H04B 7/0617 |
| 2019/0335423 | A1* | 10/2019 | Wu | H04W 72/0453 |
| 2019/0342911 | A1* | 11/2019 | Talarico | H04L 5/0098 |
| 2020/0015287 | A1* | 1/2020 | Stauffer | H04L 5/0007 |
| 2020/0036474 | A1* | 1/2020 | Luo | H04L 5/0037 |
| 2020/0220759 | A1* | 7/2020 | Katzav | H04L 27/2626 |
| 2020/0220764 | A1* | 7/2020 | Lim | H04L 1/0631 |
| 2020/0221438 | A1* | 7/2020 | Wu | H04W 74/0808 |
| 2020/0396042 | A1* | 12/2020 | Zhang | H04B 7/0617 |
| 2020/0396729 | A1* | 12/2020 | Wu | H04L 5/0044 |
| 2021/0044409 | A1* | 2/2021 | Davydov | H04L 1/1671 |
| 2021/0050893 | A1* | 2/2021 | Park | H04B 7/0626 |
| 2021/0065286 | A1* | 3/2021 | Woo | G06V 40/28 |
| 2021/0142059 | A1* | 5/2021 | Lee | G06V 10/776 |
| 2021/0160027 | A1* | 5/2021 | Werner | H04B 7/0894 |
| 2021/0364226 | A1* | 11/2021 | Park | F25D 29/00 |
| 2021/0366088 | A1* | 11/2021 | Chae | G06T 5/90 |
| 2021/0385855 | A1* | 12/2021 | Talarico | H04W 76/27 |
| 2022/0174622 | A1* | 6/2022 | Park | H04W 56/00 |
| 2022/0200669 | A1* | 6/2022 | Banuli Nanje Gowda | H04B 7/0456 |
| 2022/0256577 | A1* | 8/2022 | Oh | H04W 72/21 |
| 2022/0321304 | A1* | 10/2022 | Davydov | H04L 1/1671 |
| 2022/0337377 | A1* | 10/2022 | Zhang | H04B 7/0617 |
| 2022/0338184 | A1* | 10/2022 | Wu | H04L 5/0005 |
| 2022/0352947 | A1* | 11/2022 | Rahman | H04B 7/063 |

(56) References Cited

U.S. PATENT DOCUMENTS

| | | | | |
|---|---|---|---|---|
| 2022/0369354 A1* | 11/2022 | Seo | .................. | H04L 5/0007 |
| 2022/0377683 A1* | 11/2022 | Myung | ............ | H04W 74/0816 |
| 2022/0377805 A1* | 11/2022 | Seo | .................. | H04W 74/0833 |
| 2023/0022606 A1* | 1/2023 | Liu | .................. | H04L 5/0053 |
| 2023/0023874 A1* | 1/2023 | Kim | .................. | H04L 27/2607 |
| 2023/0051882 A1* | 2/2023 | Dai | .................. | H04B 7/0617 |
| 2023/0110721 A1* | 4/2023 | Liu | .................. | H04L 5/0055 |
| | | | | 370/330 |
| 2023/0247680 A1* | 8/2023 | Seok | .................. | H04L 5/0082 |
| 2023/0353324 A1* | 11/2023 | Zhang | ............ | H04L 1/1812 |
| 2024/0172193 A1* | 5/2024 | Wu | .................. | H04L 5/0005 |

FOREIGN PATENT DOCUMENTS

| | | |
|---|---|---|
| CN | 104868982 A | 8/2015 |
| CN | 106685499 A | 5/2017 |
| CN | 107113265 A | 8/2017 |
| CN | 107248878 A | 10/2017 |
| CN | 107346982 A | 11/2017 |
| CN | 108631924 A | 10/2018 |
| CN | 110225597 A | 9/2019 |

OTHER PUBLICATIONS

The State Intellectual Property Office of People's Republic of China. First Office Action for CN Application No. 2019113772652 and English translation, mailed Jul. 13, 2023, pp. 1-8.

The State Intellectual Property Office of People's Republic of China. First Search Report for CN Application No. 201911377265.2 and English translation, mailed Jul. 11, 2023, pp. 1-4.

Chang, C. "Cloudification and Slicing in 5G Radio Access Network," Networking and Internet Architecture, Sorbonne Universite, 2018, pp. 21-38.

European Patent Office. Extended European Search Report for EP Application No. 20906640.6, mailed Mar. 14, 2023, pp. 1-10.

Wang, J., et al. "Option 9 Function Split for the Next-Generation Fronthaul Interface based on Delta-Sigma Modulation," Proceedings of SPIE, 2019.

Gentile, K. "Section 9. Basic Digital Modulator Theory," Analog Devices, Inc., 1999, pp. 85-86.

Keysight Technologies Inc. "Concepts of Orthogonal Frequency Division Multiplexing (OFDM) and 802.11 WLAN," <https://rfmw.em.keysight.com/wireless/helpfiles/89600B/WebHelp/Subsystems/wlan-ofdm/Content/ofdm_basicprinciplesoverview.htm>.

The State Intellectual Property Office of People's Republic of China. Second Office Action for CN Application No. 201911377265.2 and English translation, mailed Jan. 15, 2024, pp. 1-7.

The State Intellectual Property Office of People's Republic of China. Supplementary Search Report for CN Application No. 201911377265.2 and English translation, mailed Jan. 15, 2024, pp. 1-4.

* cited by examiner

DOWNLINK SIGNAL PROCESSING METHOD AND APPARATUS, AND BASE STATION

CROSS-REFERENCE TO RELATED APPLICATION

This application is a national stage filing under 35 U.S.C. § 371 of international application number PCT/CN2020/130432, filed Nov. 20, 2020, which claims priority to Chinese patent application No. 201911377265.2, filed Dec. 27, 2019. The contents of these applications are incorporated herein by reference in their entirety.

TECHNICAL FIELD

Embodiments of the present disclosure relate to the technical field of communication, and in particular to a downlink signal processing method and apparatus, a base station, and a computer-readable medium.

BACKGROUND

In the communication field, a downlink signal, before being delivered, needs to be subjected to processing procedures such as modulation, layer mapping, precoding, resource element mapping (REMAP), and beamforming. Modulation refers to the process of converting various baseband signals into modulated signals suitable for channel transmission. In practical applications, after the modulation process, the number of bits of the data will be changed from few bits to many bits. In existing downlink signal processing methods, the entire processing flow needs to occupy a large quantity of memory or register resources, resulting in excessive power consumption during processing and a reduced processing efficiency.

SUMMARY

The present disclosure aims to solve at least one of the technical problems existing in some situations at least to a certain extent. Embodiments of the present disclosure provide a downlink signal processing method and apparatus, a base station, and a computer-readable medium.

In accordance with an aspect of the present disclosure, an embodiment provides a downlink signal processing method. The method includes performing resource element mapping on an unmodulated downlink signal, and performing modulation on the downlink signal that has been subjected to the resource element mapping to obtain modulated data.

In accordance with another aspect of the present disclosure, an embodiment further provides a downlink signal processing apparatus. The apparatus includes a resource element mapping function module and a modulation function module. The resource element mapping function module is configured to perform resource element mapping on an unmodulated downlink signal. The modulation function module is configured to perform, after the resource element mapping function module performs the resource element mapping on the unmodulated downlink signal, modulation on the downlink signal that has been subjected to the resource element mapping, so as to obtain modulated data.

In accordance with yet another aspect of the present disclosure, an embodiment further provides a base station. The base station includes a processor and a memory. The memory stores a computer program which, when executed by the processor, causes the processor to carry out the downlink signal processing method provided by the present disclosure.

In accordance with yet another aspect of the present disclosure, an embodiment further provides a computer-readable medium. The computer-readable medium stores a computer program which, when executed by a processor, causes the processor to carry out the downlink signal processing method provided by the present disclosure.

BRIEF DESCRIPTION OF DRAWINGS

The drawings are provided for a further understanding of the embodiments of the present disclosure, and constitute a part of the description. The drawings and the embodiments of the present disclosure are used to illustrate the present disclosure, but are not intended to limit the present disclosure. The above and other features and advantages will become more apparent to those having ordinary skill in the art by describing detailed embodiments with reference to the accompanying drawings, in which.

DETAILED DESCRIPTION

Figure 1:
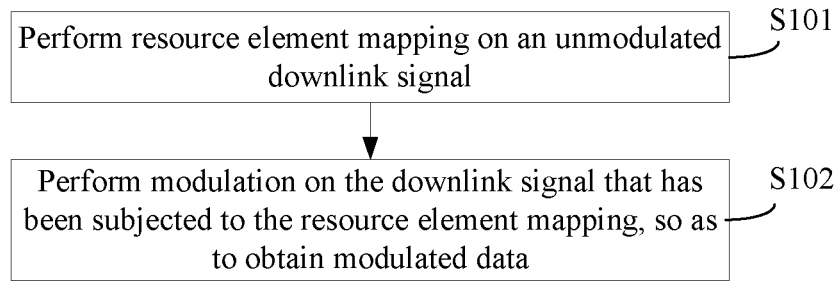
FIG. 1 is a flowchart of a downlink signal processing method according to an embodiment of the present disclosure.

In order for those having ordinary skill the art to better understand the technical schemes of the present disclosure, a downlink signal processing method and apparatus, a base station, and a computer-readable medium provided by the present disclosure are described in detail below with reference to the accompanying drawings.

Embodiments are described more fully below with reference to the accompanying drawings, but which may be embodied in different forms and should not be construed as limited to the embodiments set forth herein. Rather, these embodiments are provided for the purpose of making the present disclosure thorough and complete, and will fully convey the scope of the present disclosure to those having ordinary skill in the art.

The terminology used herein is used to describe particular embodiments only and is not intended to limit the present disclosure. As used herein, the singular forms "a", "an", and "the" are intended to include the plural forms as well, unless the context clearly dictates otherwise. It will also be understood that when used in this description, the terms "include", "comprise", and/or "made of" as well as their variants mean that the stated features, integers, steps, operations, elements, and/or components are present, but do not exclude the presence or addition of one or more other features, integers, steps, operations, elements, components, and/or groups thereof.

It will be understood that although the terms such as "first" and "second" may be used herein to describe various elements/instructions/requests, these elements/instructions/ requests should not be limited by these terms. These terms are only used to distinguish one element element/instruction/ request from another element element/instruction/request.

Unless otherwise defined, the meanings of all the terms (including technical and scientific terms) used herein are intended to be the same as those commonly understood by those having ordinary skill in the art. It will also be understood that the terms such as those defined in common dictionaries should be construed as having meanings consistent with their meanings in the context of the existing technology and the present disclosure, and should not be construed as having idealized or over-formal meanings, unless otherwise expressly defined herein.

In the communications field, transmission of a downlink signal requires processing procedures such as channel coding, scrambling, modulation, layer mapping, precoding, resource element mapping, and beamforming.

Modulation refers to the process of converting various baseband signals into modulated signals (modulated signals or frequency band signals) suitable for channel transmission. According to different parameters of the controlled signal, modulation may be divided into: amplitude modulation, frequency modulation, and phase modulation. Amplitude modulation refers to the process of varying the amplitude of a carrier with the magnitude of a modulation signal. Frequency modulation refers to the process of varying the instantaneous frequency of a carrier with the magnitude of a control signal while keeping the amplitude of the carrier unchanged. Phase modulation refers to the process of using an original signal to control the phase of a carrier signal. After a baseband signal is modulated, in the time domain, information is carried on a carrier for transmission by controlling a change of one or several parameters of a carrier signal; in the frequency domain, information is transmitted by moving a spectrum of the baseband signal to a channel passband or a frequency range in the channel passband.

Because a digital baseband signal has only several discrete values, the modulation of the digital baseband signal is like using a digital signal to control a switch to select oscillations with different parameters. Therefore, the modulation process of the digital baseband signal is called keying, including amplitude shift keying (ASK), frequency-shift keying (FSK) and phase shift keying (PSK) corresponding to different modulation methods. For PSK, quadrature phase shift keying (QPSK) is mostly used in practice, and a QPSK signal may be expressed as $i(t)\cos 2\pi ft - q(t)\sin 2\pi fct$, where the first part is an in-phase component, and the second part is a quadrature component. There is also a modulation method called Quadrature Amplitude Modulation (QAM) with better performance. The QAM is characterized in that not only the amplitudes but also the phases are different between the symbols, and is a modulation method based on both amplitude and phase. In QPSK, the symbols have the same amplitude but different phases, so that the average power is higher, while in QAM, the average power is smaller because the amplitudes of the symbols are different. Therefore, in the case of the same average power, the value of the level of each symbol in QAM can be higher than that in QPSK, so the signal-to-noise ratio is increased.

Layer mapping is used to map data to one or more layers, and map a complex-valued modulation symbol of a codeword to-be-transmitted into one or more layers, so as to implement serial-to-parallel conversion and control the multiplexing rate of spatial multiplexing.

Precoding is used to match layer data with antenna ports, and at the same time reduce or control the interference between spatially multiplexed data streams, reduce the complexity of receiver implementation, and reduce system overheads.

Resource element mapping (REMAP) is mainly for arranging data of each downlink physical channel such as PDSCH and PDCCH to fill the entire bandwidth in order in the frequency domain. Multiplexing data blocks from multiple channels into a shared data channel is the so-called resource element mapping. Each orthogonal frequency division multiplexing (OFDM) symbol has its own resource element mapping.

Beamforming, also known as spatial filtering, is a signal processing technique used in sensor arrays for directional signal transmission or reception. In the beamforming technology, parameters of basic units of a phased array are adjusted in such a way that signals at particular angles experience constructive interference while others experience destructive interference. Beamforming can effectively suppress the interference.

In some cases, as specified in 3GPP 5G protocols, in the IF3 splitting method of CU-DU, downlink signal processing in 5G NR requires a series of downlink data processing procedures such as modulation, layer mapping, precoding, REMAP, beamforming, etc. This has always been a downlink signal processing flow widely used in the industry. Based on these cases, the inventors of the present disclosure have realized that whether QPSK or QAM is used in the modulation process, the original data bits will change from few bits to many bits after modulation. For example, in QPSK, each 2-bit IQ data is modulated into 32-bit IQ data, with the data volume being increased by 16 times; in 256QAM, each 8-bit IQ data is modulated into 32-bit IQ data, with the data volume being increased by 4 times. When the existing downlink signal processing methods are used for processing, a storage device such as a RAM or register in a circuit-level implementation needs to buffer data in units of 32 bits, occupying a large quantity of resources in the storage device such as the RAM or register. Based on this, the inventors of the present disclosure propose a novel downlink signal processing method by improving existing downlink signal processing methods. The downlink signal processing method provided by the present disclosure is especially suitable for 5G scenarios.

FIG. 1 is a flowchart of a downlink signal processing method according to the present disclosure. As shown in FIG. 1, the method includes steps S101 and S102.

At S101, resource element mapping is performed on an unmodulated downlink signal.

At S102, modulation is performed on the downlink signal that has been subjected to the resource element mapping, so as to obtain modulated data.

In the downlink signal processing method provided by the embodiments of the present disclosure, the modulation step is executed after the resource element mapping step, so that in practical circuit implementations, the RAM or register does not need to buffer data of many bits, thereby lowering the requirements on the storage capacity of the RAM or register and reducing the power consumption during processing.

In addition, it should be noted that it has been proved through experiments that the sequence of modulation and REMAP does not affect the final processing result, i.e., the downlink signal processing method provided by the embodiments of the present disclosure does not affect the performance of the downlink system.

Figure 2:
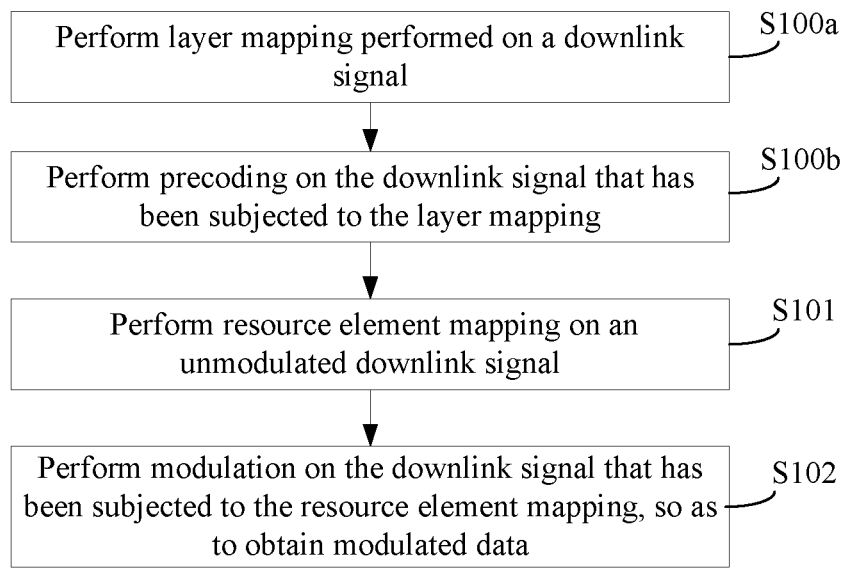
FIG. 2 is a flowchart of another downlink signal processing method according to an embodiment of the present disclosure.

FIG. 2 shows another downlink signal processing method according to an embodiment of the present disclosure. As shown in FIG. 2, in some embodiments, prior to S101, the method further includes steps S100a and S100b.

At S100a, layer mapping is performed on a downlink signal.

At S100b, precoding is performed on the downlink signal that has been subjected to the layer mapping.

At S100a and S100b, layer mapping and precoding are respectively performed on the downlink signal. In practical applications, S100a and S100b cooperate to realize a Multiple-Input Multiple-Output (MIMO) function, so as to multiply the capacity and spectrum utilization of the communication system without increasing the bandwidth. First, downlink data to be transmitted is mapped into one or more layers through layer mapping (i.e., a codeword stream is remapped to multiple layers according to a certain rule, to form a new data stream), so as to implement serial-to-parallel conversion and control the multiplexing rate of spatial multiplexing. Then, the layer-mapped downlink signal is precoded to match layer data to antenna ports, so as to realize the MIMO function.

It should be noted that, detailed implementation processes of the layer mapping and the precoding belong to conventional technologies in the art, so the details will not be described in the embodiments of the present disclosure.

In addition, in the embodiment of the present disclosure, at S101, the resource element mapping is performed on the downlink signal that has been subjected to precoding. That is to say, in the present disclosure, the term "downlink signal" does not refer in particular to a specific downlink signal, but generally refers to any downlink signal.

Figure 3:
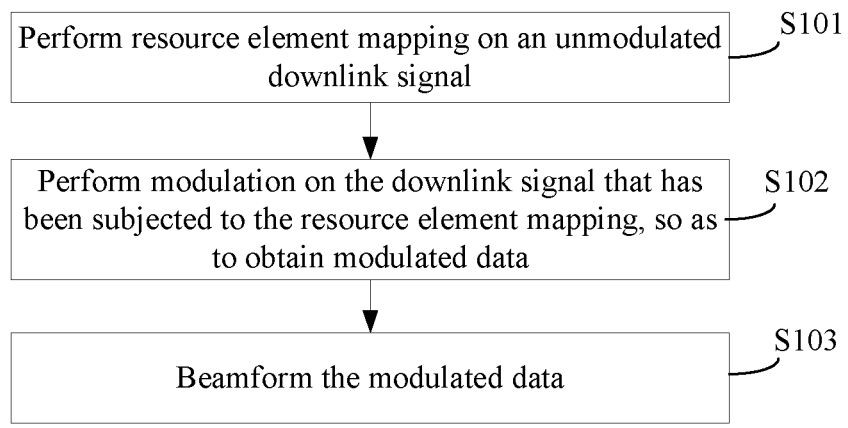
FIG. 3 is a flowchart of still another downlink signal processing method according to an embodiment of the present disclosure.

FIG. 3 shows still another downlink signal processing method according to an embodiment of the present disclosure. As shown in FIG. 3, in some embodiments, after step S102, the method further includes step S103.

At S103, the modulated data is beamformed.

Beamforming (also known as smart antenna) belongs to generalized MIMO, which requires only a transmit end to support multiple antennas and does not require configuring multiple antennas at a receive end. Beamforming realizes the directional transmission of signals through a small-pitch antenna array (where the antenna pitch is usually less than the wavelength of an electromagnetic wave, and is, for example, a half wavelength), thereby improving the received signal strength of a target user and reducing the interference to users in other directions. The beamforming in the embodiments of the present disclosure may adopt any existing beamforming method suitable for downlink signal processing, which will not be described in detail herein.

In some embodiments, the beamforming may be implemented based on a multiply-accumulate method. In the embodiments of the present disclosure, a faster convergence speed can be achieved by adopting the multiply-accumulate method.

It should be noted that, different steps in the foregoing embodiments may be combined with each other to form new technical schemes, and such new technical schemes should also fall within the protection scope of the present disclosure and will not be enumerated herein.

Figure 4:
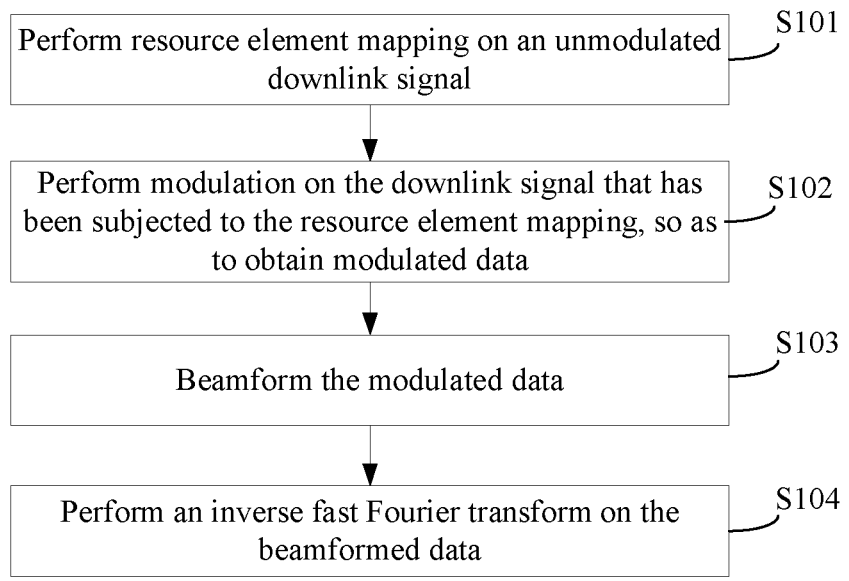
FIG. 4 is a flowchart of yet another downlink signal processing method according to an embodiment of the present disclosure.

FIG. 4 shows yet another downlink signal processing method according to an embodiment of the present disclosure. As shown in FIG. 4. in some embodiments, after step S103, the method further includes step S104.

At S104, an inverse fast Fourier transform is performed on the beamformed data.

An inverse Fourier transform is used to convert a frequency domain representation of a signal into a time domain representation. In the embodiment of the present disclosure, after being beamformed, the modulated data is subjected to the inverse fast Fourier transform, so that the modulated data can be converted from the frequency domain to the time domain, thereby facilitating the subsequent transmission of the time domain signal by a transmitting circuit. The inverse fast Fourier transform is a conventional technical means in the art, so the details will not be described in the embodiments of the present disclosure.

Figure 5:
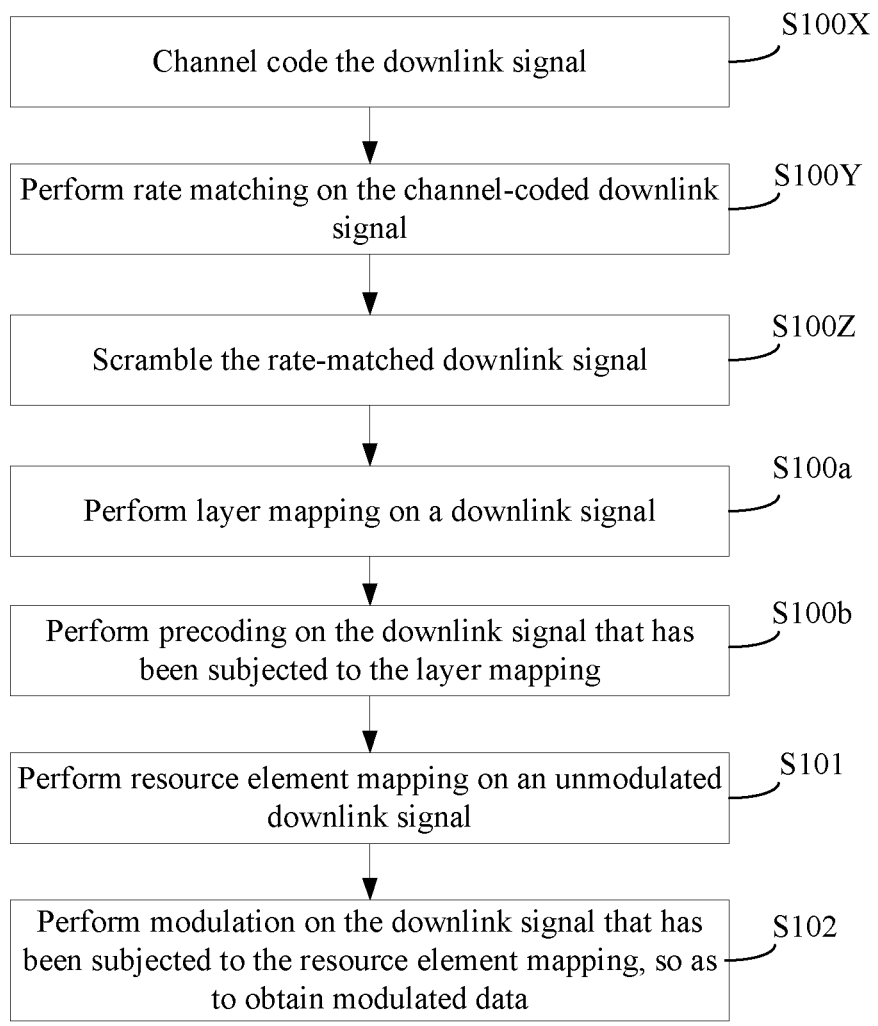
FIG. 5 is a flowchart of yet another downlink signal processing method according to an embodiment of the present disclosure.

FIG. 5 shows yet another downlink signal processing method according to an embodiment of the present disclosure. As shown in FIG. 5. in some embodiments, prior to step S100a, the method further includes steps S100X, S100Y, and S100Z.

At S100X, the downlink signal is channel coded.

At S100Y, rate matching is performed on the channel-coded downlink signal.

At S100Z, the rate-matched downlink signal is scrambled.

A downlink signal needs to be subjected to channel coding, rate matching, and scrambling before being sent, so as to reduce the interference of the transmission channel and improve the transmission efficiency of the transmission channel. Channel coding, rate matching, and scrambling are conventional technical means in the art, so the details will not be described in the embodiments of the present disclosure. In addition, in the embodiment of the present disclosure, at S100a, the layer mapping is performed on the scrambled downlink signal.

In some embodiments, the downlink signal may be a digital signal. In this case, the corresponding modulation performed at S102 may include: quadrature phase shift keying (QPSK) and quadrature amplitude modulation (QAM). QPSK and QAM have excellent performance in modulating digital signals.

Figure 6:
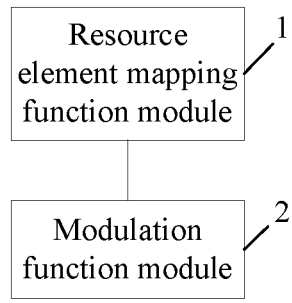
FIG. 6 is a schematic structural diagram of a downlink signal processing apparatus according to an embodiment of the present disclosure.

An embodiment of the present disclosure further provides a downlink signal processing apparatus. As shown in FIG. 6. the apparatus includes: a resource element mapping function module 1 and a modulation function module 2.

The resource element mapping function module 1 is configured to perform resource element mapping on an unmodulated downlink data (i.e., map information of each channel into a complete frequency domain bandwidth of each OFDM symbol). The modulation function module 2 is configured to, in response to the resource element mapping function module 1 having performed the resource element mapping on the unmodulated downlink data, perform modulation on the downlink data that has been subjected to the resource element mapping, so as to obtain modulated data (i.e., move a spectrum of a baseband signal to a channel passband or a frequency range in the channel passband).

In the downlink signal processing apparatus provided by the embodiments of the present disclosure, the modulation step is executed after the resource element mapping step, so that in practical circuit implementations, the RAM or register does not need to buffer data of many bits, thereby lowering the requirements on the storage capacity of the RAM or register and reducing the power consumption during processing.

Figure 7:
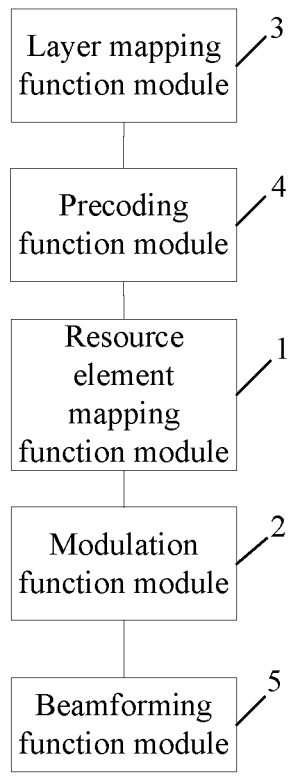
FIG. 7 is a schematic structural diagram of another downlink signal processing apparatus according to an embodiment of the present disclosure.

FIG. 7 is a schematic structural diagram of another downlink signal processing apparatus according to an embodiment of the present disclosure. As shown in FIG. 5, in some embodiments, the apparatus further includes: a layer mapping function module 3 and a precoding function module 4.

The layer mapping function module 3 is configured to perform layer mapping on a downlink signal before the resource element mapping function module 1 performs the resource element mapping on the unmodulated downlink signal (i.e., remap a codeword stream to multiple layers according to a certain rule, to obtain a new data stream). The precoding function module 4 is configured to perform precoding on the downlink signal that has been subjected to the layer mapping, after the layer mapping function module 3 performs the layer mapping on the downlink signal (i.e., map layer-mapped data to different antenna ports).

The layer mapping function module 3 and the precoding function module 4 in the embodiment of the present disclosure are configured to implement the above method steps S100a and S100b in the present disclosure. For details, reference may be made to the description of the above steps S100a and S100b, which will not be repeated herein.

Still referring to FIG. 7, in some embodiments, the apparatus further includes: a beamforming function module 5 configured to beamform the modulated data after the modulation function module 2 performs the modulation on the downlink signal that has been subjected to the resource element mapping, so as to obtain modulated data.

In some embodiments, the beamforming function module 5 may implement the beamforming based on a multiply-accumulate method.

In the embodiment of the present disclosure, the beamforming function module 5 is configured to implement the above method step S103 in the present disclosure. For details, reference may be made to the description of the above step S103, which will not be repeated herein.

Figure 8:
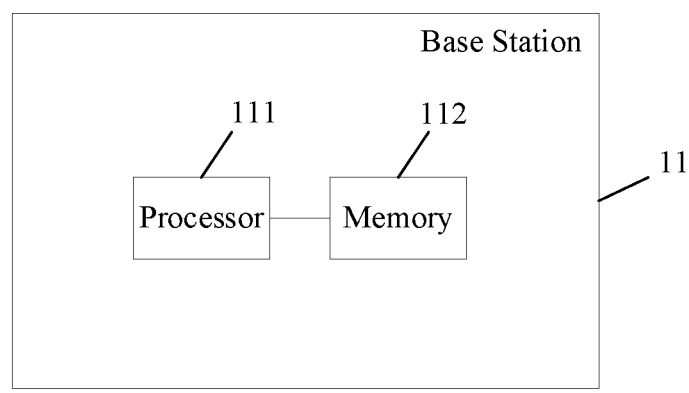
FIG. 8 is a schematic structural diagram of a base station according to an embodiment of the present disclosure.

FIG. 8 is a schematic structural diagram of a base station according to an embodiment of the present disclosure. As shown in FIG. 8, the base station 11 includes: a processor 111 and a memory 112. The memory 112 stores a computer program which, when executed by the processor 111, causes the processor 111 to carry out any one of the downlink signal processing methods provided by the foregoing embodiments of the present disclosure.

An embodiment of the present disclosure further provides a computer-readable medium, storing a computer program which, when executed by a processor, cause the processor to carry out any one of the downlink signal processing methods provided by the foregoing embodiments of the present disclosure.

In the downlink signal processing method and apparatus, base station, and computer-readable medium provided by the embodiments of the present disclosure, the modulation step is executed after the resource element mapping step, so that in practical circuit implementations, the RAM or register does not need to buffer data of many bits, thereby lowering the requirements on the storage capacity of the RAM or register and reducing the power consumption during processing.

Those having ordinary skill in the art can understand that all or some of the steps in the methods disclosed above and the functional modules/units in the system and the apparatus can be implemented as software, firmware, hardware, and appropriate combinations thereof. In a hardware implementation, the division of the functional modules/units mentioned in the above description does not necessarily correspond to the division of physical components. For example, one physical component may have multiple functions, or one function or step may be jointly executed by several physical components. Some or all physical components may be implemented as software executed by a processor, such as a central processing unit, a digital signal processor, or a microprocessor, or as hardware, or as an integrated circuit, such as an application-specific integrated circuit. Such software may be distributed on a computer-readable medium, which may include a computer storage medium (or non-transitory medium) and a communication medium (or transitory medium). As is known to those having ordinary skill in the art, the term "computer storage medium" includes volatile and nonvolatile, removable and non-removable media implemented in any method or technology for storage of information (such as computer readable instructions, data structures, program modules, or other data). The computer storage medium includes, but not limited to, a random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette, a magnetic tape, a magnetic disk storage or other magnetic storage device, or any other medium which can be used to store the desired information and which can be accessed by a computer. In addition, as is known to those having ordinary skill in the art, the communication medium typically includes computer-readable instructions, data structures, program modules, or other data in a modulated data signal such as a carrier or other transport mechanism, and may include any information passing medium.

The embodiments have been disclosed herein, and although specific terms are employed, they are used and should only be construed in a general descriptive sense and not for purposes of limitation. In some examples, it will be apparent to those having ordinary skill the art that unless expressly stated otherwise, a feature, characteristic, and/or element described in conjunction with a particular embodiment may be used alone or in combination with a feature, characteristic, and/or element described in conjunction with another embodiment. Therefore, it will be understood by those having ordinary skill in the art that various changes in form and details may be made without departing from the scope of the present disclosure as set forth in the appended claims.

What is claimed is:

1. A downlink signal processing method, comprising:
   performing resource element mapping on an unmodulated downlink signal; and
   performing complex symbol modulation on the downlink signal that has been subjected to the resource element mapping, to obtain modulated data: wherein, prior to performing resource element mapping on the unmodulated downlink signal, further comprising:
   performing layer mapping on the unmodulated downlink signal; and
   performing precoding on the unmodulated downlink signal that has been subjected to the layer mapping; and
   wherein performing the resource element mapping on the unmodulated downlink signal, comprising arranging data of the unmodulated downlink signal to fill an entire bandwidth in order of frequency domain.

2. The method of claim 1, after performing the complex symbol modulation on the downlink signal that has been subjected to the resource element mapping to obtain the modulated data, further comprising:
   beamforming the modulated data.

3. The method of claim 2, wherein the beamforming comprises:
   beamforming the modulated data based on a multiply-accumulate method.

4. The method of claim 2, after beamforming the modulated data, further comprising:
   performing an inverse fast Fourier transform on the beamformed data.

5. The method of claim 1, prior to performing the layer mapping on the unmodulated downlink signal, further comprising:
   channel coding the unmodulated downlink signal;
   performing rate matching on the channel-coded downlink signal; and
   scrambling the rate-matched downlink signal.

6. The method of claim 1, wherein the downlink signal is a digital signal, and ways for the complex symbol modulation include: quadrature phase shift keying (QPSK) and quadrature amplitude modulation (QAM).

7. A downlink signal processing apparatus, comprising:
   a resource element mapping function module, configured to perform resource element mapping on an unmodulated downlink signal; and
   a modulation function module, configured to perform, after the resource element mapping function module performs the resource element mapping on the unmodulated downlink signal, complex symbol modulation on the downlink signal that has been subjected to the resource element mapping, to obtain modulated data;
   prior to performing the resource element mapping on the unmodulated downlink signal, further comprising:
   performing layer mapping on the unmodulated downlink signal; and
   performing precoding on the unmodulated downlink signal that has been subjected to the layer mapping; and
   wherein performing the resource element mapping on the unmodulated downlink signal, comprising arranging data of the unmodulated downlink signal to fill an entire bandwidth in order of frequency domain.

8. A base station, including:
   a processor; and
   a memory, storing a computer program which, when executed by the processor, causes the processor to carry out the method of claim 1.

9. A non-transitory computer-readable medium, storing a computer program which, when executed by a processor, causes the processor to carry out a downlink signal processing method, the method comprising:
   performing resource element mapping on an unmodulated downlink signal; and
   performing complex symbol modulation on the downlink signal that has been subjected to the resource element mapping, to obtain modulated data;
   wherein, prior to performing resource element mapping on the unmodulated downlink signal, further comprising:
   performing layer mapping on the unmodulated downlink signal; and
   performing precoding on the unmodulated downlink signal that has been subjected to the layer mapping; and
   wherein performing the resource element mapping on the unmodulated downlink signal, comprising arranging data of the unmodulated downlink signal to fill an entire bandwidth in order of frequency domain.

* * * * *